United States Patent
Kosaka (10) Patent No.: US 8,537,274 B2
(45) Date of Patent: Sep. 17, 2013

(54) IMAGE CAPTURE APPARATUS

(75) Inventor: Katsuki Kosaka, Kanagawa (JP)

(73) Assignee: Sony Corporation, Tokyo (JP)

(*) Notice: Subject to any disclaimer, the term of this patent is extended or adjusted under 35 U.S.C. 154(b) by 444 days.

(21) Appl. No.: 12/100,025

(22) Filed: Apr. 9, 2008

(65) Prior Publication Data

US 2008/0252752 A1     Oct. 16, 2008

(30) Foreign Application Priority Data

Apr. 10, 2007   (JP) .............................. P2007-103243

(51) Int. Cl.
   *H04N 5/225*   (2006.01)
   *H04N 5/76*    (2006.01)

(52) U.S. Cl.
   USPC .................. 348/374; 348/231.8; 348/373

(58) Field of Classification Search
   USPC .... 348/373–376, 222.1, 231.99, 231.1–231.9
   See application file for complete search history.

(56) References Cited

U.S. PATENT DOCUMENTS

| | | | |
|---|---|---|---|
| 5,790,193 A * | 8/1998 | Ohmori | 348/375 |
| 7,239,806 B2 * | 7/2007 | Chen | 396/301 |
| 7,372,501 B2 * | 5/2008 | Fujii | 348/373 |
| 2002/0125327 A1 * | 9/2002 | Izumi et al. | 235/487 |
| 2004/0027463 A1 | 2/2004 | Kawamura | |
| 2004/0190889 A1 * | 9/2004 | Hagiuda et al. | 396/205 |
| 2004/0212727 A1 * | 10/2004 | Ariga | 348/375 |
| 2005/0174477 A1 * | 8/2005 | Amano et al. | 348/375 |
| 2006/0125933 A1 * | 6/2006 | Kim | 348/231.1 |
| 2007/0165996 A1 * | 7/2007 | Inaba et al. | 386/38 |
| 2007/0291166 A1 * | 12/2007 | Misawa | 348/376 |

FOREIGN PATENT DOCUMENTS

| | | | |
|---|---|---|---|
| JP | 10 269325 | | 10/1998 |
| JP | 11 17987 | | 1/1999 |
| JP | 2003 69951 | | 3/2003 |
| JP | 2005-071426 | * | 3/2005 |
| JP | 2005 71426 | | 3/2005 |
| WO | WO 2004 088977 | | 10/2004 |

* cited by examiner

*Primary Examiner* — Tuan Ho
*Assistant Examiner* — Akshay Trehan
(74) *Attorney, Agent, or Firm* — Frommer Lawrence & Haug LLP; William S. Frommer (57) ABSTRACT

An image capture apparatus includes an imaging-unit storing portion, a memory-card storing portion, and a lid. The imaging-unit storing portion stores an imaging unit capturing an image. The memory-card storing portion is arranged in the rear of the imaging-unit storing portion and includes a card slot for loading a memory card that stores an image signal obtained by capturing the image in the imaging unit. The lid covers the card slot arranged to the memory-card storing portion, and opens and closes by sliding along a side surface of a body of the image capture apparatus from a position covered therewith.

6 Claims, 9 Drawing Sheets

IMAGE CAPTURE APPARATUS

CROSS REFERENCE TO RELATED APPLICATIONS

The present invention contains subject matter related to Japanese Patent Application 2007-103243 filed in the Japanese Patent Office on Apr. 10, 2007, the entire contents of which being incorporated herein by reference.

BACKGROUND OF THE INVENTION

1. Field of the Invention

The invention relates to an image capture apparatus applied to a video camera using a memory card as a storage medium that stores an image signal obtained by capturing a subject image.

2. Description of the Related Art

In the past, a video camera integrally provided with a recording unit uses a magnetic tape, an optical disc or the like as a storage (recording) medium for storing an image signal obtained by capturing a subject image. On the contrary, a memory card incorporating a semiconductor memory has been put into practical use as a recording medium along with an increase in storage capacity and reduced costs of such semiconductor memory.

When using a storage medium such as magnetic tape and optical disc, video cameras may require a motor or other moving mechanism for a recording unit included in the video camera. In contrast, when using a memory card as the storage medium, such moving mechanism may not be required, so that data can be stored (written) and reproduced (read) readily. Further, the outside dimensions of memory card are smaller than such magnetic tape and optical disc, so that video cameras may require only a small and light portion for loading such a storage medium.

Japanese Unexamined Patent Application Publication No. 2003-69951 has a description on an example of a video camera that uses a memory card as a storage medium.

SUMMARY OF THE INVENTION

Video cameras may be provided with a card slot for loading a memory card. In such case, an appropriate position may need to be selected to arrange the card slot. Particularly, in the case of a broadcast video camera used in broadcast stations and other professional-use cameras similarly used, such memory card may need to be replaced readily while shooting is carried out. However, it has been difficult to replace such memory card readily in a video camera according to related art.

Specifically, a broadcast or professional-use video camera is configured to have an optical system including a lens, an optical filter and the like arranged at the front. An imaging unit including a prism for the optical system and an image sensor is arranged at a position subsequent to the position of the optical system (i.e., behind the optical system). The imaging unit also incorporates a circuit block configured to perform imaging signal processing of obtaining a predetermined image signal (video signal) upon receiving the imaging signal with the image sensor. A card slot for loading a memory card is typically provided to a position adjacent to the imaging unit.

Such imaging unit forms a body of a video camera. When the video camera is held by a user, a position in the vicinity of the imaging unit may be held by the user's hand. Hence, there is a high possibility of the card slot for loading a memory card being covered with the hand that holds the body of the video camera if the position of the card slot arranged is inappropriately selected. It has been difficult to provide a video camera that is easy to be held by hand and in which a memory card can be replaced readily.

For example, such card slot may be arranged at the rear end that is the farthest position from the lens of the video camera. With such a configuration, the card slot may not be covered with the hand holding the video camera and it seems that the position is appropriate for arranging the card slot. However, a viewfinder is actually arranged at the rear end of the video camera, so that the face of the user looking into the viewfinder comes close to the rear end. Hence, it is unfavorable to arrange the card slot at the rear end.

Further, when the card slot is arranged, such a member serving as a lid may need to be provided to the position of the arranged card slot so that the memory card loaded into the card slot is prevented from slipping out of the card slot if any impact is applied to the video camera. The position of such lid is so determined that the opening lid may not interfere with the hand holding the video camera; otherwise, the user holding the video camera may not replace the memory card.

It is desirable to improve the usability of replacing a memory card in an image capture apparatus using a memory card as a storage medium.

According to an embodiment of the invention, there is provided an image capture apparatus including an imaging-unit storing portion that stores an imaging unit capturing an image. The image capture apparatus stores an image signal obtained by capturing the image at the imaging unit into a memory card. A memory-card storing portion is arranged at the rear of the imaging-unit storing portion and includes a card slot for loading the memory card. Further, a lid is provided to cover the card slot arranged to the memory-card storing portion. The lid is slidable along the side surface of a body of the image capture apparatus.

According to the embodiment, the lid is slidable along the side surface of the body of the image capture apparatus. Therefore, the lid slides on the side of the body so that the card slot is exposed to load the memory card and to remove the loaded memory card.

According to the embodiment, the lid slidable along the side surface of the body of the image capture apparatus is provided. When sliding the lid, the card slot is exposed to remove the memory card loaded therein and load another memory card thereto without difficulty.

DESCRIPTION OF THE PREFERRED EMBODIMENTS

Hereinafter, an embodiment of the invention will be described with reference to the accompanied drawings. The embodiment of the invention is applied to a camcorder incorporating a storage unit (recording unit) using a memory card as a recording medium in which video signals obtained by capturing images are stored. In this embodiment, a memory card according to a standard of Express Card™ is used.

Figure 1:
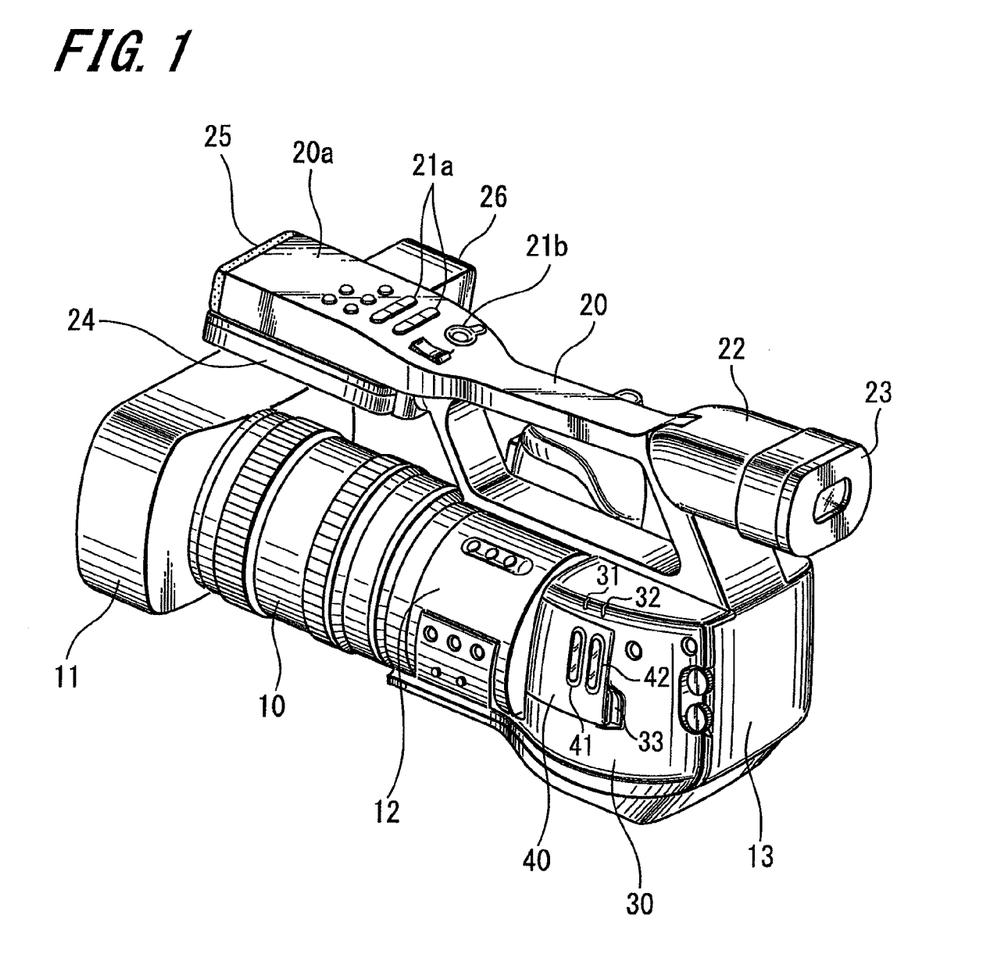
FIG. 1 is a perspective view showing an example of configuration of an image capture apparatus according to an embodiment of the invention.
Figure 2:
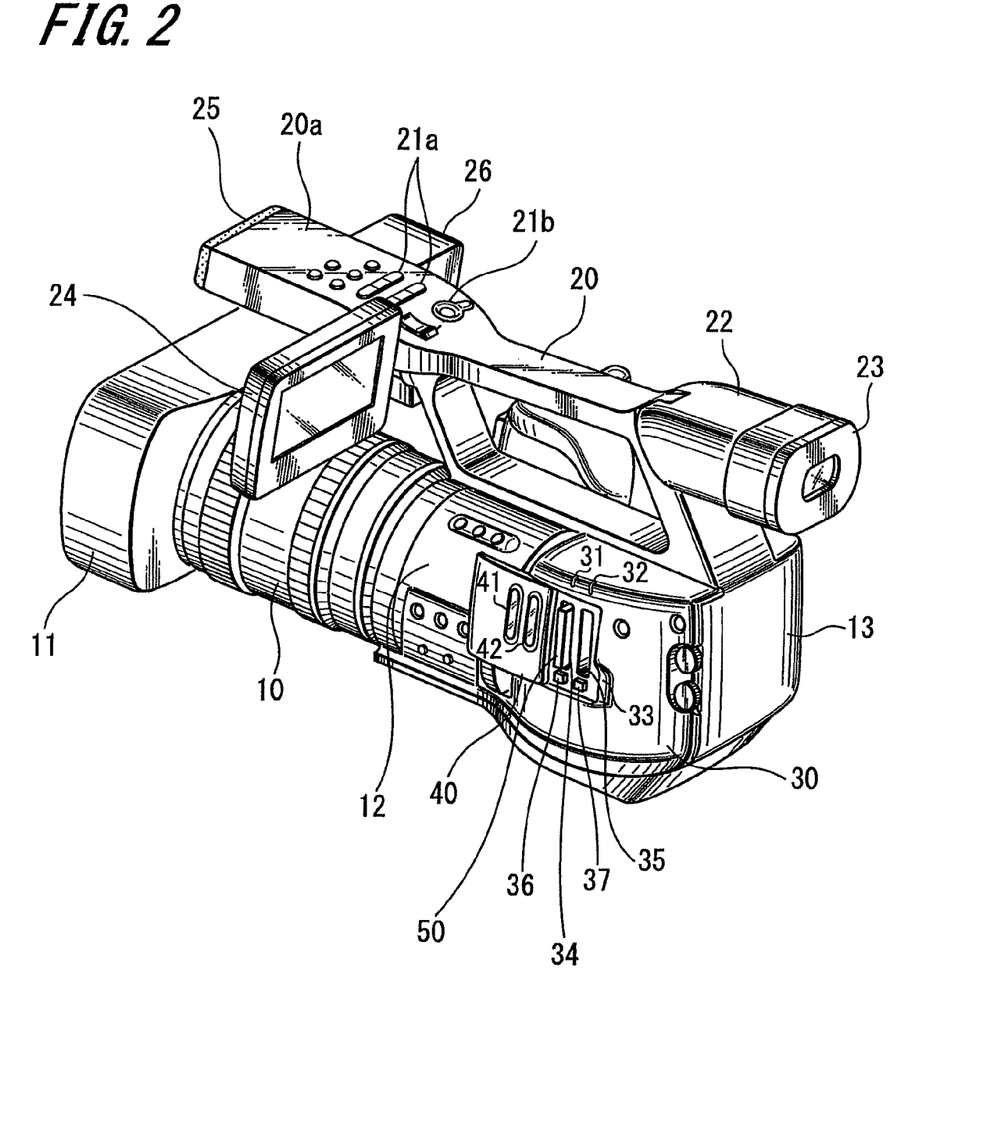
FIG. 2 is a perspective view showing an example of configuration of an image capture apparatus (where a lid is open) according to an embodiment of the invention.
Figure 3:
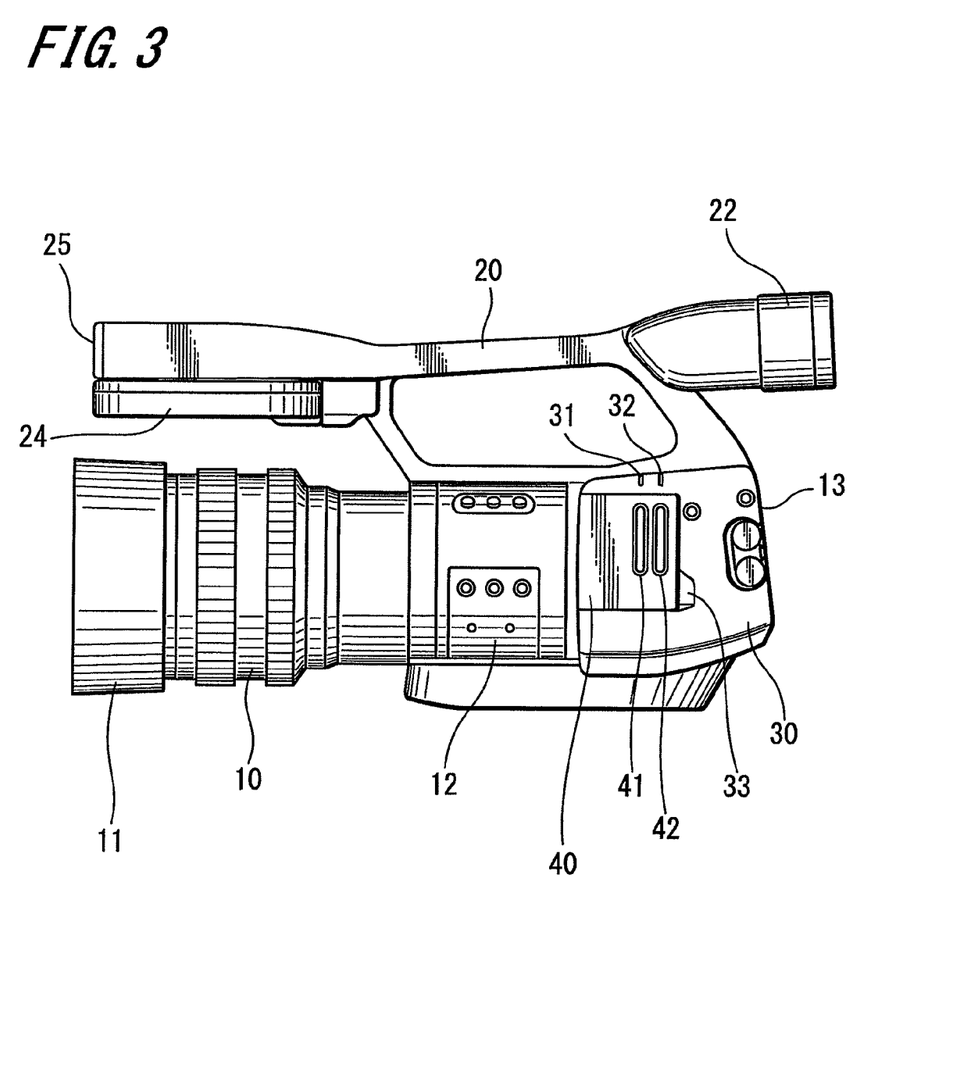
FIG. 3 is a side view showing a left side surface of the image capture apparatus according to an embodiment of the invention.
Figure 4:
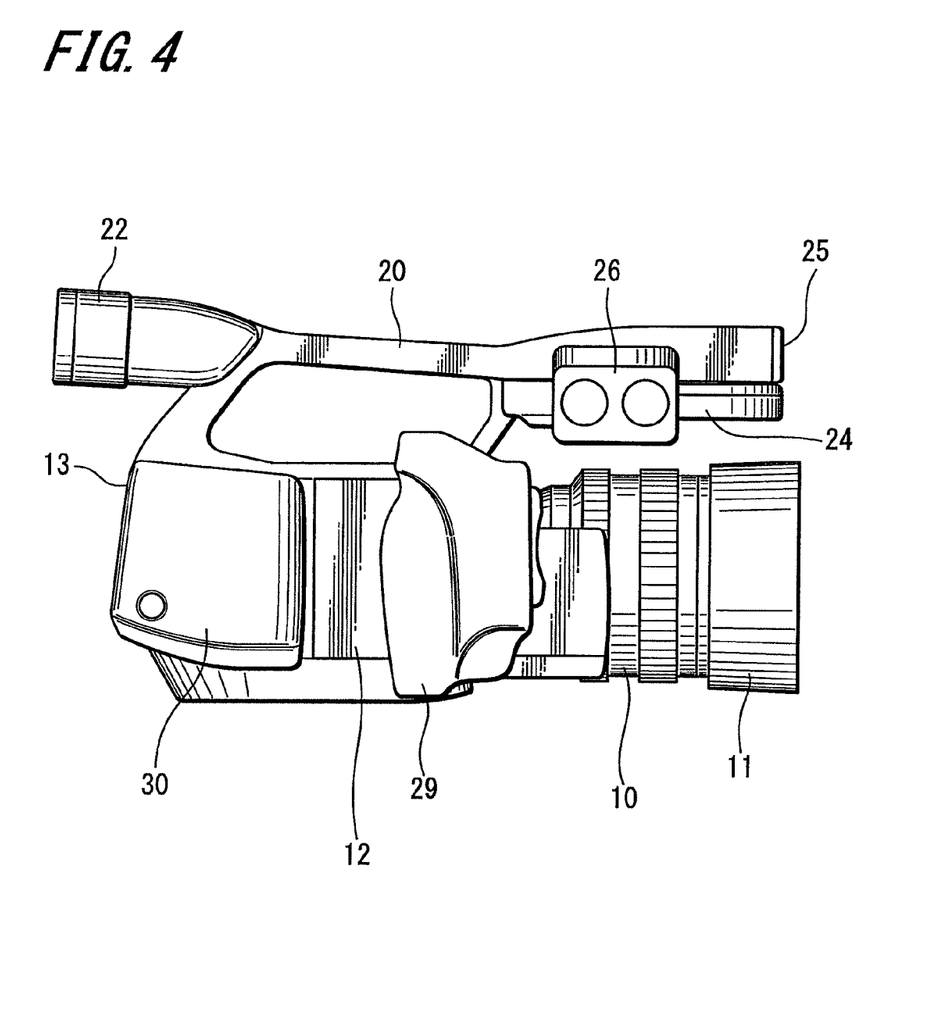
FIG. 4 is a side view showing a right side surface of the image capture apparatus according to an embodiment of the invention.
Figure 5:
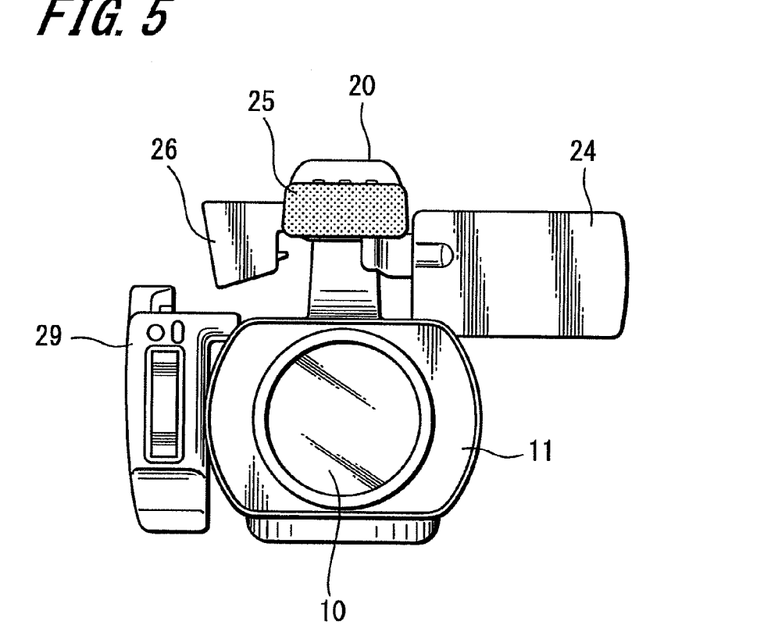
FIG. 5 is a front view of an image capture apparatus according to an embodiment of the invention.
Figure 6:
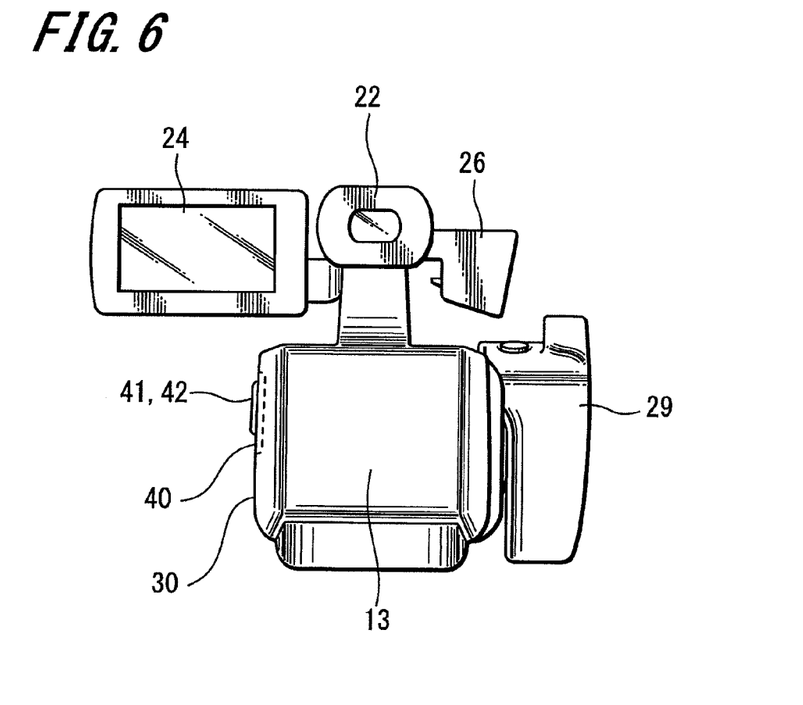
FIG. 6 is a rear view of an image capture apparatus according to an embodiment of the invention.
Figure 7:
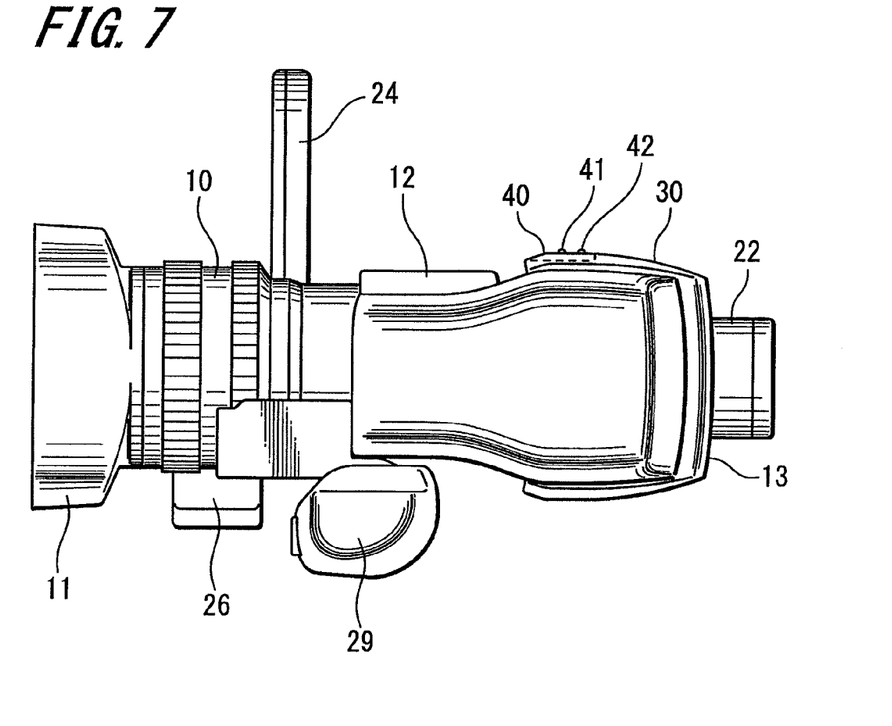
FIG. 7 is a bottom view of an image capture apparatus according to an embodiment of the invention.
Figure 8:
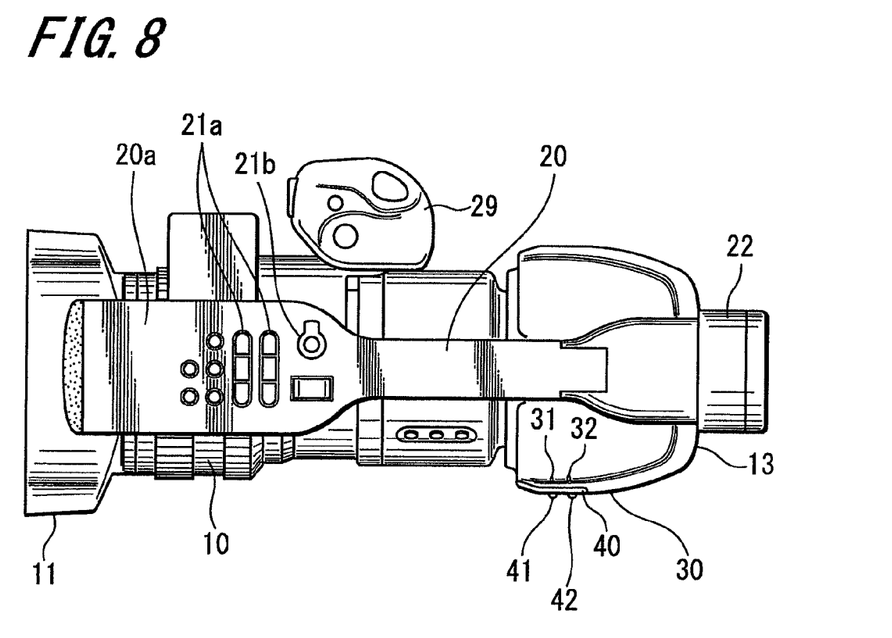
FIG. 8 is a top view of an image capture apparatus according to an embodiment of the invention.

FIGS. 1 and 2 are perspective views showing an example of configuration of an image capture apparatus according to the embodiment. FIGS. 1 and 2 are perspective views both of which are shown obliquely backward. FIG. 1 shows the image capture apparatus with a lid 40 of a memory-card storing portion 30 is closed. FIG. 2 shows the image capture apparatus with the lid 40 being open. FIGS. 3 to 8 are diagrams showing each face of the image capture apparatus according to the embodiment. Specifically, FIG. 3 is a side view showing the left side surface of the image capture apparatus. FIG. 4 is a side view showing the right side surface of the image capture apparatus. FIG. 5 is a front view showing the front of the image capture apparatus. FIG. 6 is a rear view of the image capture apparatus. FIG. 7 is a bottom view of the image capture apparatus. FIG. 8 is a top view of the image capture apparatus. FIGS. 1 and 2 are mainly referred to in the following description; however, FIGS. 3 to 8 are also referred to according to need.

The image capture apparatus according to the embodiment includes a lens unit 10, a lens hood 11, and an imaging-unit storing portion 12. The lens unit 10 includes a plurality of zoom lenses and other lenses. The lens hood 11 is arranged to block undesired light incident on the lens unit 10. The imaging-unit storing portion 12 stores an imaging unit that converts subject light incident through the lens unit 10 into a video signal. Further, the memory-card storing portion 30 is provided at the rear of the imaging-unit storing portion 12. Furthermore, a battery storing portion 13 storing a battery for supplying power to respective units of the image capture apparatus is provided in the rear of the memory-card storing portion 30. It should be noted that in the following description the side where the lens hood 11 is attached is referred to as the front side (forward direction) and the side where the battery storing portion 13 is provided is referred to as the rear side (backward direction).

The lens hood 11 is attached to the front end of the lens unit 10 on the light incident side. The imaging-unit storing portion 12 is connected to the light output side of the lens unit 10. The imaging-unit storing portion 12 stores a prism and image sensors. The prism separates light (imaging light) incident through the lens unit 10 into light beams of three primary colors. The image sensors are arranged on output surfaces for respective light beams separated with the prism. The image sensor converts imaging light into an electric imaging signal.

In addition, a circuit board, on which an imaging signal processing circuit is arranged, and the like are also provided in the imaging-unit storing portion 12. The imaging signal processing circuit is configured to process the imaging signal converted by the image sensors, thereby obtaining an image signal (video signal) of a predetermined format.

The memory-card storing portion 30 and the battery storing portion 13 are arranged in the rear of the imaging-unit storing portion 12. The imaging-unit storing portion 12, the memory-card storing portion 30, and battery storing portion 13 are stored in a single chassis to form a body of the image capture apparatus. It should be noted that a mechanism that attaches and detaches the battery stored in the battery storing portion 13 is not described in each drawing.

A handle 20 is provided above the body of the image capture apparatus in the direction parallel with the light axis of the lens unit 10. The handle 20 is so shaped that the user can grasp and hold it readily by hand, when the user carries the image capture apparatus. The user grasps the handle 20 by hand to hang the image capture apparatus.

A viewfinder 22 is arranged at the rear end of the handle 20 and used for determining a composition of the picture and carrying out focusing. Further, an eye cup 23 is attached to the end of the viewfinder 22. A small display having a screen size of approximately one inch is arranged in the viewfinder 22 and the user directly checks the display by moving his/her eye close to the eye cup 23.

A microphone 25 is arranged at the front end of the handle 20. Further, an audio processing unit that carries out encoding processing and the like on audio signals obtained by the microphone 25 is stored in an audio-processing-unit storing portion 26 arranged on a side surface of the handle 20. An operation portion is arranged on the upper surface of the handle 20 in the slight rear of the position of the microphone 25. The operation portion is arranged to input operation signals associated with reproduction and recording of the image signal obtained by the imaging unit.

The operation portion includes reproduction operation buttons 21a for carrying out operation relating to reproduction, a recording button 21b for indicating the start and end of the recording, and the like.

A display unit 24 is provided on the lower side of a portion 20a toward the front end of the handle 20, in other words, on the side opposite the surface where the operation portion is arranged. The display unit 24 is configured to display image signals obtained at the imaging unit as an image (or display an image obtained by reproducing image signals having been recorded). The display unit 24 is formed by storing a liquid crystal image display panel 24a with a screen having diagonal dimension of approximately 3.5 inches in a chassis. Other image display panels than the liquid crystal panel may be used.

The display unit 24 is turned and pulled out from under the handle 20 to be used. FIG. 1 shows a state in which the display unit 24 is stored and FIG. 2 shows an example of a state in which the display unit 24 is pulled out.

As shown in FIG. 1, the memory-card storing portion 30 arranged in the rear of the imaging-unit storing portion 12 that constitutes the body of the image capture apparatus is provided with the lid 40 on the left side surface of the image capture apparatus. As shown in FIG. 2, card slots 34, 35 are exposed when sliding the lid 40 forward along the side surface.

The image capture apparatus according to the embodiment includes two card slots 34, 35, that are vertically arranged in parallel with each other. Card ejecting buttons 36, 37 are arranged below the card slots 34, 35, respectively. Memory cards stored in the respective card slots 34, 35 can be removed by pushing the respective buttons 36, 37. FIG. 2 shows a state in which a memory card 50 has been loaded in the card slot 34 and a memory card is not loaded in the card slot 35. The card ejecting buttons 36, 37 are also arranged at a position capable of being covered with the lid 40 in the state in which the lid 40 is closed.

Two windows 41, 42, which are vertically long, are arranged in the lid 40. The windows 41, 42 are arranged at the position corresponding to the position of the card slots 34, 35 and whether the memory card 50 is loaded or not is checked through the respective windows 41, 42, in the state of the lid 40 being closed. The windows 41, 42 are formed with a transparent or semitransparent resin member.

The windows 41, 42 slightly project to the outside from the surface of the lid 40. FIG. 6, which is the rear view of the image capture apparatus, illustrates the projecting windows 41, 42. The lid 40 is shown in broken lines in FIG. 6.

Card pilot lamps 31, 32 are arranged in parallel at a position above the card slots 34, 35, respectively. As shown in FIG. 1, the two card pilot lamps 31, 32 are exposed to the outside in the state in which the lid 40 is closed. The card pilot lamp 31 shows an access state or the like of the memory card loaded to the card slot 34 with emission of light. The card pilot lamp 32 shows an access state or the like of the memory card loaded to the card slot 35 with emission of light.

As shown in FIG. 1, when the lid 40 is being closed, a dent 33 is formed on the surface of the memory-card storing portion 30 next to the edge of the lid 40. When sliding the lid 40, the edge of the lid 40 is caught and pushed with a finger of the user inserted in the dent 33, causing the lid 40 to slide forward. In addition, as described above, since the windows 41, 42 of the lid 40 slightly project to the outside, the projecting portion of the windows 41, 42 can be caught with the finger to slide the lid 40 backward.

Spring force or other force is used to keep the lid 40 in the closed state (see FIG. 1) and the open state (see FIG. 2). Therefore, when pushing with force greater than that, the lid 40 closes and opens by sliding.

Further, as shown in FIG. 4 that is a right side view, and other figures, the image capture apparatus according to the embodiment is provided with a grip 29 in the vertical direction on the right side of the body of the image capture apparatus. In this example, the grip 29 is arranged on the right side of the imaging-unit storing portion 12.

Subsequently, an example in which the user holds the image capture apparatus to capture an image is described with reference to FIGS. 9 and 10. When the user holds the image capture apparatus to capture an image, the user grasps the grip 29 by the right hand, as shown in FIG. 10. A button to start recording is arranged on the grip 29.

Figure 9:
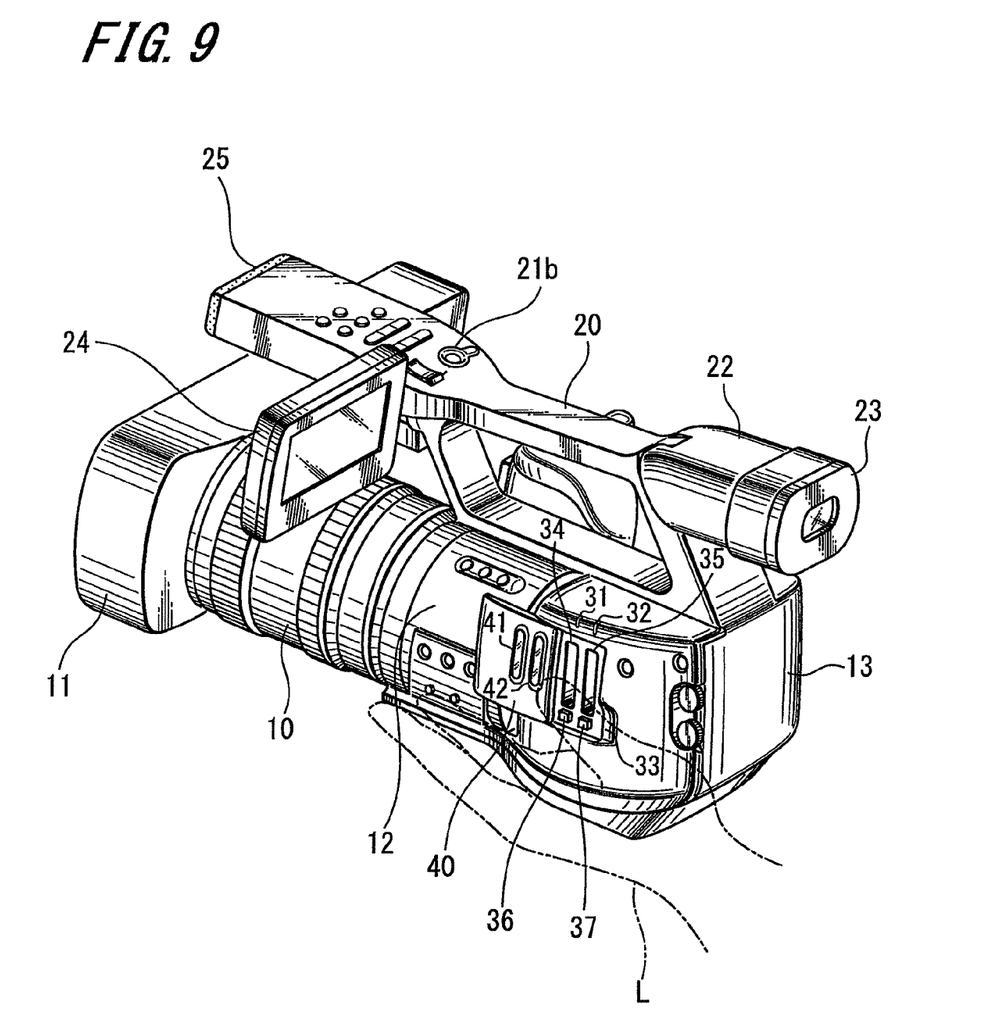
FIG. 9 is a perspective view showing a left side surface of an image capture apparatus according to an embodiment of the invention which is held by, for example, a hand.
Figure 10:
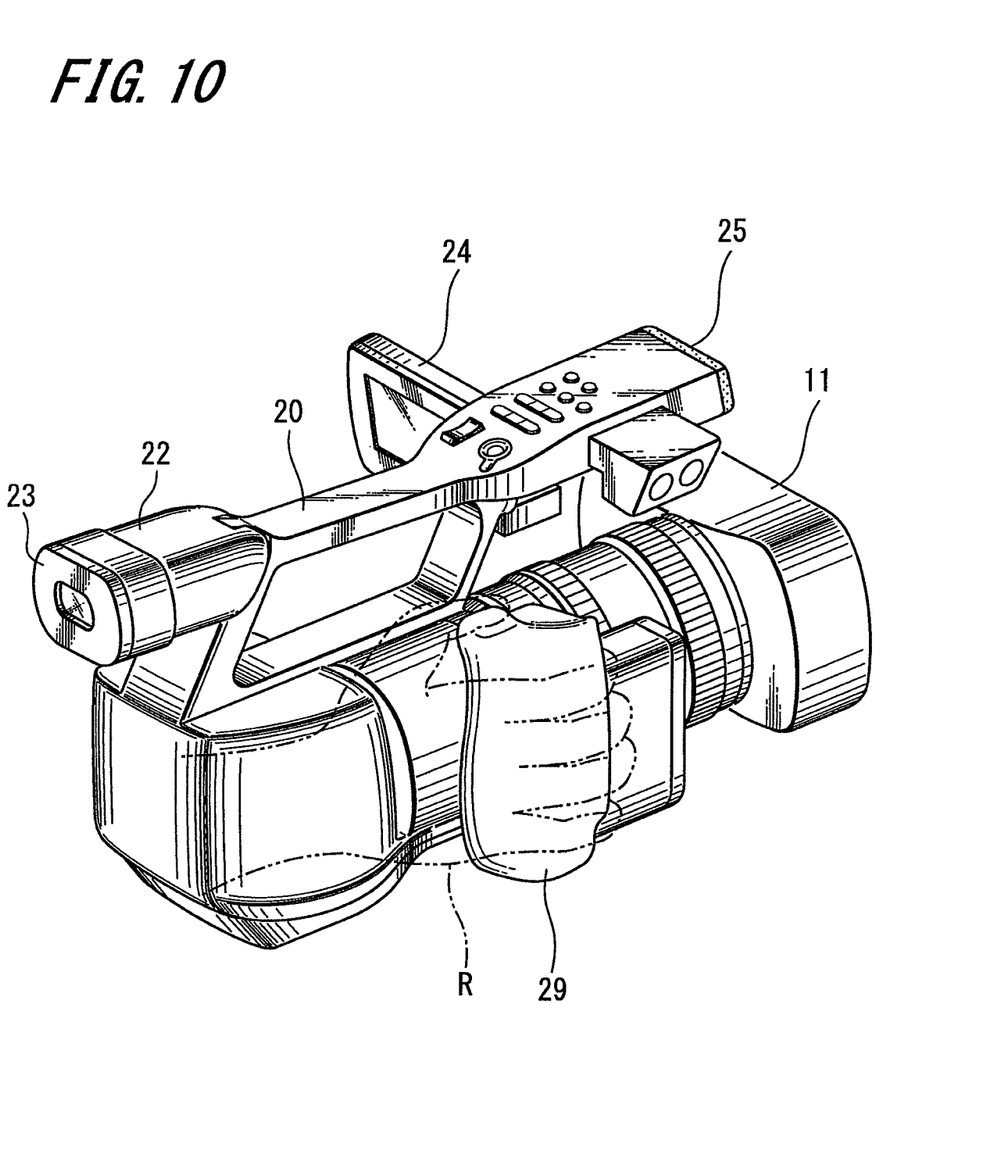
FIG. 10 is a perspective view showing a right side surface of an image capture apparatus according to an embodiment of the invention which is held by, for example, a hand.

In this state, the left hand L of the user typically supports the bottom and left surface of the imaging-unit storing portion 12, as shown in FIG. 9. The memory card stored in the memory-card storing portion 30 may need to be replaced in the state as shown in FIG. 9. Here, a finger (e.g., thumb in FIG. 9) of the left hand L of the user positioned on the left side of the imaging-unit storing portion 12 pushes the lid 40 forward, thereby opening the lid 40 and exposing the card slots. When pushing any of the card ejecting buttons 36, 37, the memory card loaded into the card slot is ejected to some extent and removed by the left hand. Another memory card is loaded by inserting the card into any of the card slots 34, 35.

As heretofore described, according to an embodiment of the invention, a memory card can be replaced without difficulty in a state in which the image capture apparatus is held. Specifically, the lid 40 for the card slots is arranged on the left side surface of the image capture apparatus, so that the memory card can be replaced by sliding the lid 40 with the left hand that is a hand opposite to the right hand holding the image capture apparatus, while shooting. In addition, since the lid 40 slides forward, the lid can be prevented from interfering with the face looking into the viewfinder 22, which is also favorable for replacing the memory card.

Figure 11:
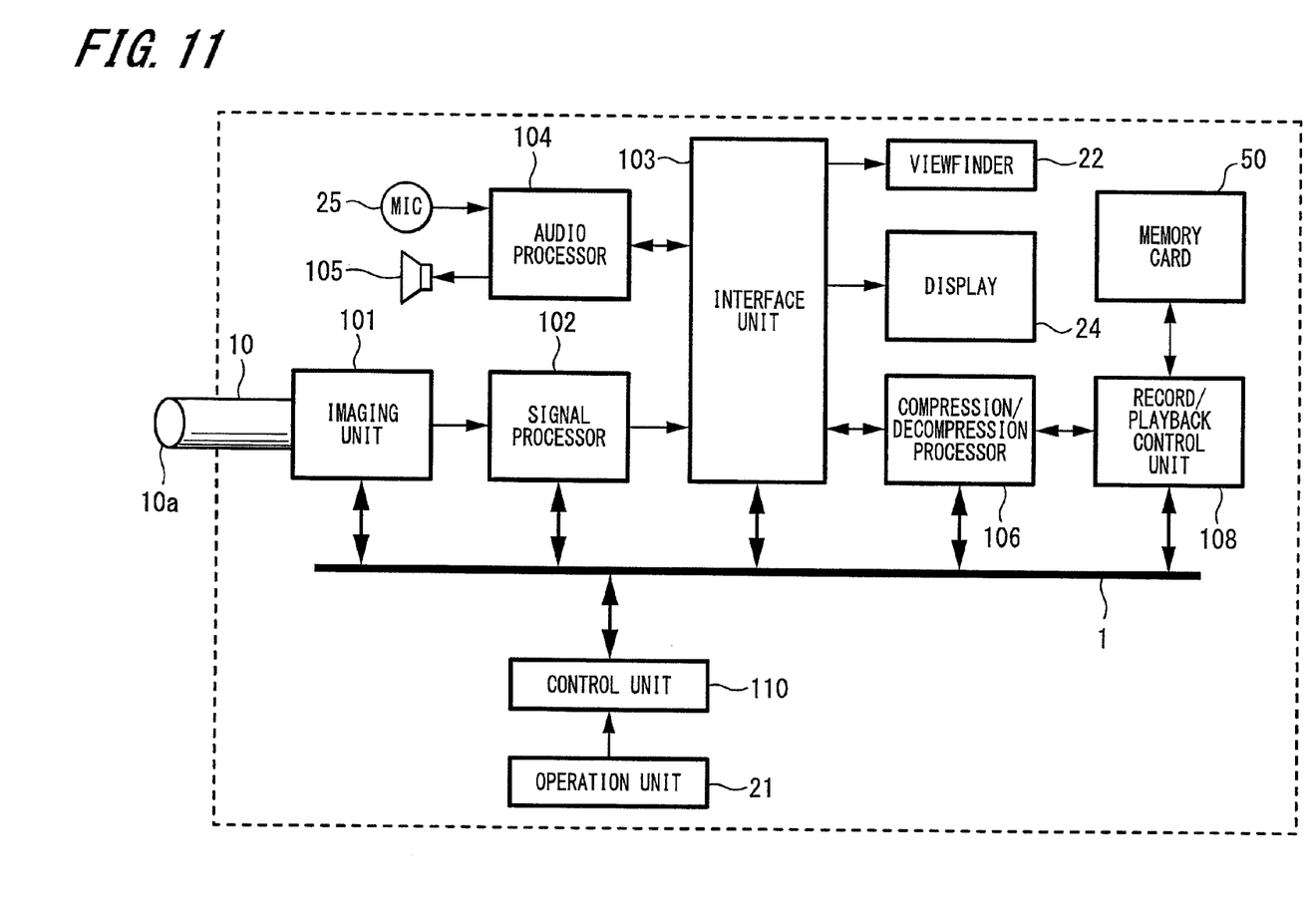
FIG. 11 is a block diagram showing an exemplified internal configuration of an image capture apparatus according to an embodiment of the invention.

Next, an example of the internal configuration of the above-described image capture apparatus is described with reference to FIG. 11. The image capture apparatus shown in FIG. 11 includes the lens unit 10 and an imaging unit 101. The lens unit 10 has a lens group including a lens 10a. The imaging unit 101 is configured to photoelectrically convert subject light forming an image through the lens group of the lens unit 10 and output the light as an image signal. The imaging unit 101 includes an analog/digital convertor (hereinafter referred to as an A/D convertor) not shown. Subsequent to the A/D convertor, there is connected a signal processor 102 that carries out digital signal processing on the digital video signal output from the A/D convertor.

The signal processor 102 carries out knee correction that compresses a video signal of more than a certain luminance level and gamma correction that corrects the level of the video signal according to a predetermined gamma curve. In addition, the signal processor 102 carries out white-clip processing or black-clip processing of restricting the signal level of the video signal within a predetermined level, and so on.

The imaging unit 101 and the signal processor 102 carry out imaging and processing under the control of a control unit 110, respectively. The control unit 110 is a central control unit including a central processing unit (CPU) and so on. The control unit 110 controls not only the imaging unit 101 and the signal processor 102 but also each of other units of the image capture apparatus connected through a transmission line 1. Upon receiving an input operation at an operation unit 21 connected to the control unit 110, the control unit 110 controls each unit. The operation unit 21 may include the above-described reproduction operation buttons 21a, recording button 21b and so on.

The video signal subjected to digital-signal processing in the signal processor 102 is transmitted to an interface unit 103 that transmits and receives data between the respective units. The interface unit 103 is connected to the viewfinder 22, the display 24, and a compression/decompression processor 106. The viewfinder 22 allows the user to determine the composition of an image, adjust a focus, and so on. The display 24 displays images being captured with the imaging unit 101 or reproduced video that has been recorded in a later-described external recording medium. The compression/decompression processor 106 performs compression or decompression on video signals. Furthermore, the compression/decompression processor 106 is connected to a record/playback control unit 108 through which the memory card 50 loaded into the card slot 34 or 35 (see FIG. 2) can be connected.

The compression/decompression processor 106 performs compression-processing of an image signal captured with the imaging unit 101 according to a standard, such as MPEG (Moving Picture Experts Group) standard. Data compressed at the compression/decompression processor 106 is transmitted to the memory card 50 through the record/playback control unit 108 and then recorded in the memory card 50. The compression/decompression processor 106 also performs decompression-processing of the compressed video data recorded in the memory card 50. The decompressed video data is then transmitted to the interface unit 103.

The record/playback control unit 108 performs the processing of writing (recording) video data compressed according to a predetermined format at the compression/decompression processor 106 into the memory card 50. In addition, the record/playback control unit 108 performs the control of reading and playing back the video data recorded in the memory card 50. According to the embodiment, since two card slots, that is, the card slots 34, 35 are each prepared to load the memory card 50, the memory cards loaded into the card slots 34, 35 are alternately used, enabling continuous recording for a long time to be carried out.

It should be noted that a lock mechanism for preventing the loaded memory cards from slipping off the card slots 34, 35 arranged at the image capture apparatus is not particularly provided. Accordingly, when closing the lid 40, the lid 40 directly serves as a member preventing the memory cards from slipping off the card slots.

According to the above-described embodiment, the invention is applied to an image capture apparatus that uses a memory card alone as a storage medium; however, the invention may be applied to an image capture apparatus that uses other storage media than a memory card, in addition to the memory card. Further, memory cards according to other standards than the above-described express cards may be used. Furthermore, two card slots are provided in the above-described example. Alternatively, only one slot or more than two card slots may be arranged. Moreover, card slots are vertically provided in the above-described example. Alternatively, the card slots may be arranged horizontally.

Furthermore, according to the above-described embodiment, the lid of the card slots slides forward when opened. Alternatively, the lid may slide in any direction as long as not interfering with the hand holding the body of the image capture apparatus and the face looking into the viewfinder. For example, the lid may slide in the upper direction to open.

It should be understood by those skilled in the art that various modifications, combinations, sub-combinations and alterations may occur depending on design requirements and other factors insofar as they are within the scope of the appended claims or the equivalents thereof.

What is claimed is

1. An image capture apparatus comprising:
    an imaging-unit storing portion that stores an imaging unit capturing an image;
    a memory-card storing portion arranged in the rear of the imaging-unit storing portion and including two or more card slots for loading two or more memory cards that store image signals obtained by capturing the image in the imaging unit; and
    a lid that includes two or more windows and covers substantially only the card slots, the lid being arranged to the memory-card storing portion,
    wherein the lid is arranged on a particular side surface of the memory-card storing portion arranged in the rear of the imaging-unit storing portion, and
    wherein opening and closing the lid is completed by sliding along a direction parallel to the particular side surface of the body of the image capture apparatus on which the lid is arranged, toward a side of the image capture apparatus where lens hood is attached and opposite to a side of the image capture apparatus where a viewfinder is attached without interfering with a user's face looking into the viewfinder,
    wherein the side of the image capture apparatus on which the lid is arranged is opposite to a side of the image capture apparatus on which a grip is arranged, so that opening and closing the lid is completed by sliding the lid with one hand of the user and holding the image capture apparatus with another hand of the user while shooting is carried out.

2. The image capture apparatus according to claim 1, wherein
    the lid is allowed to slide and open in the direction of a lens attached to the body of the image capture apparatus.

3. The image capture apparatus according to claim 1, further comprising
    a grip on a side surface of the body of the image capture apparatus, the side surface being opposite to the side surface of the body of the image capture apparatus where the lid is arranged.

4. The image capture apparatus according to claim 1, wherein the lid has the windows for checking a state of the two or more memory cards loaded into the card slots.

5. The image capture apparatus according to claim 1, wherein
    the window projects from the surface of the lid.

6. The image capture apparatus according to claim 1, wherein
    a dent is provided on the surface of the memory-card storing portion next to the lid in a closed state.

* * * * *